United States Patent [19]

Ito et al.

[11] 4,358,510

[45] Nov. 9, 1982

[54] METALLIC PAINTING

[75] Inventors: Satoru Ito; Tadashi Watanabe; Shinji Sugiura, all of Hiratsuka, Japan

[73] Assignee: Kansai Paint Co., Ltd., Hyogo, Japan

[21] Appl. No.: 134,140

[22] Filed: Mar. 26, 1980

[30] Foreign Application Priority Data

Apr. 5, 1979 [JP] Japan .................................. 54-40305

[51] Int. Cl.$^3$ ........................ B05D 3/02; B32B 27/10; B05D 1/36; B05D 7/00
[52] U.S. Cl. .................................... 428/463; 427/379; 427/388.2; 427/409; 428/481; 428/483; 428/502; 428/526; 524/441; 524/504; 524/512; 525/54.3; 527/313; 527/314; 428/462; 428/464; 428/461
[58] Field of Search .................. 427/409, 388.5, 388.2, 427/379; 260/13, 17.4 UC, 17 A, 42.22; 428/463, 464, 462, 481, 483, 502, 526; 525/54.3; 527/313, 314; 524/504, 512, 441

[56] References Cited

U.S. PATENT DOCUMENTS

| | | | |
|---|---|---|---|
| 3,475,356 | 10/1969 | Davis et al. ........................... | 260/13 |
| 3,639,147 | 2/1972 | Benefiel et al. ................. | 427/409 X |
| 3,639,147 | 2/1972 | Benefiel et al. ..................... | 117/73 |
| 4,208,465 | 6/1980 | Chang ................................. | 428/416 |

FOREIGN PATENT DOCUMENTS 44-77725 9/1969 Japan .
49-38005 10/1974 Japan .

*Primary Examiner*—Michael R. Lusignan
*Attorney, Agent, or Firm*—Wenderoth, Lind & Ponack

[57] ABSTRACT

A process for forming a metallic paint film comprising
(a) coating on a substrate surface a metallic paint containing as a vehicle component a modified vinyl-type copolymer obtained by copolymerizing 5–75 weight % of cellulose acetate butyrate with 95–25 weight % of a monomeric component consisting of one or more vinyl-type monomers,
(b) if necessary, coating a thermosetting resin-type clear topcoating while said coated metallic paint film is in the unhardened state and
(c) then baking the paint film.

16 Claims, No Drawings

METALLIC PAINTING

The present invention relates to metallic painting, and more particularly, to a process for forming a metallic paint film excellent in appearance (metallic feeling, smoothness, gloss and the like) and quality (chemical resistance, adhesive forces between coated films, adhesion to a substrate, resistance to water and weather, etc.) by metallic painting using a two-coat baking process (hereinafter abbreviated as a "2C-1B process") or by a one-coat, one-baking process (hereinafter abbreviated as a "1C-1B process") and a novel metallic paint usable in said process.

Metallic painting by the 2-coat and 1-baking process has recently been noticed as a painting process affording excellent appearance and quality and is widely used for painting of automobile and truck bodies, and various researches have been conducted for improving the quality of the paints. The metallic base paint to be used for this process contains in the paint, metallic powders such as aluminum powders different in shape and particle diameter from ordinary pigments so as to reflect light and impart a metallic appearance.

In this metallic base paint, the metallic feeling and color tone of the paint film vary depending on the arrangement of the metallic powders in the base paint film at the time of forming the paint film. And to form a paint film rich in metallic feeling, it is important for the metallic powders contained in said paint to be placed in the direction of reflecting more light in the painted film, and if they are arranged in the direction of sparingly reflecting light, the light is not reflected, resulting in a paint film having a wholly poor metallic feeling.

Particularly, in the case wherein the viscosity of a metallic paint, after the coating, is not easily increased, in many cases the metallic powders freely move with the movement of the solvent contained therein and as a result said metallic powders tend to reflect less light.

Hence, in general, it is important for a the viscosity of a metallic paint to increase as rapidly as possible after the coating to bar the undesirable movement of such metallic powders and several attempts have been made to effect this end.

Especially, for a metallic paint used as a base paint in 2C-1B process to have a good appearance, quality and finish, it is necessary that the movement of the metallic powders in the base coating be suspended, that is, the metallic powders be stationary in the base coating after the metallic base paint has been applied and before a clear topcoating is applied.

For this purpose, there has been previously employed a method of using a metallic base paint diluted with a highly volatile solvent with the use of acrylic resins having a comparatively great molecular weight as a vehicle. The setting or restraint of movement of the metallic powders is achieved in such processes by taking advantage of the rise of viscosity of said paint and the paint film at the time of, and after, coating the metallic base paint. However, this method has the disadvantages that the viscosity rise, after the coating, is not so great, the setting or prevention of movement of the metallic powders occurs too late, and it is difficult to form a paint film rich in metallic feeling, because the metallic powders move and are oriented in various directions.

On the other hand, in Japanese Patent Publication No. 38005/74, it is proposed that if a cellulose acetate butyrate (hereinafter abbreviated as "CAB") is blended with a metallic base paint of this type, the viscosity rise of the paint and paint film at the time of, and after, the coating vigorously occurs as compared with one with CAB unblended to form a metallic paint film having an excellent appearance and high quality. However, since in general, the compatibility of CAB with acrylic resins is poor, there occurs troubles in that the paint becomes turbid during storage or chemical seeding occurs in the paint, and consequently, storage stability becomes poor. To avoid such defects it is necessary to use acrylic resins having a good compatibility with CAB, but there is a restriction in respect to the composition of the monomers constituting the resins, and among them, the blending of the styrene monomer is highly restricted. Even if it is blended, about 5–10 weight % based on the monomer composition constituting the acrylic resin is the upper limit in practical use, and in fact, the styrene monomer is scarcely ever used.

On the other hand, a styrene monomer as a constituent component of an acrylic resin plays a very important role in improving the various properties, such as improving the adhesion to the substrate, the adhesive force between the metallic paint film and a clear top-coated film, the dispersion of pigment in the metallic paint and also improves the resistance to water, chemicals and weather of the whole metallic painting system. However, the blending of such styrene monomer must be restricted because of poor storage stability which fairly adversely affects those properties. However, the fact seems to be that the conventional metallic paints cannot but sacrifice the above properties such as adhesion to a substrate, adhesive force between coated films, pigment dispersion and resistance to water, chemicals, and weather if good storage stability is to be insured.

After conducting strenuous research for the purpose of basically improving the abovementioned disadvantages of an acrylic resin-CAB blending system in a metallic paint, the inventors have recently found that if a given copolymer of CAB with vinyl-type monomers is used as the vehicle of a metalic paint, the problem of storage, stability due to the poor compatibility of CAB with acrylic resins can be solved at once and accordingly it becomes possible to eliminate the quantitative restriction of the styrene monomer as a constituent of the vehicle resin and a metallic paint film can be formed. Such paint is excellent in various properties, such as adhesion to a substrate, in exhibiting a strong adhesive force between the metallic paint film and the clear top-coated film and resistance to water, chemicals and weather in the whole metallic painting system. Yet, metallic paint using a copolymer of CAB-vinyl-type monomer as a vehicle has an abundance of gloss and smoothness and the capability of forming a metallic paint film excellent in resistance to water, chemicals and weather even by 1C-1B process and does not particularly require the coating with a clear topcoating, unlike conventional paints.

According to one aspect of the present invention, it thus provides a process for forming a metallic paint film characterized by
 (a) coating a substrate surface with a metallic paint containing as a vehicle component, a modified vinyl-type copolymer obtained by copolymerizing 5–75 weight % of CAB with 95–25 weight % of a monomeric component consisting of one or more vinyl-type monomers, (b) coating, if necessary, a thermosetting resin-type clear topcoating while said coated metallic paint film is in the unhardened state and (c) then, baking the paint film.

According to another aspect of the invention, the present invention provides a novel metallic paint to be used in the above process characterized by containing as a vehicle component a modified vinyl-type copolymer obtained by copolymerizing 5-75 weight % of CAB and 95-25 weight % of a monomeric component consisting of one or more vinyl-type monomers.

The process and paint in the present invention will be described in detail below.

The metallic paint of the present invention is essentially characterized by containing as a vehicle resin a copolymer of CAB and a monomeric component consisting of one or more vinyl-type monomers.

CAB is a cellulose derivative obtained by further butyl etherifying a partially acetylized cellulose compound and as the CAB preferably used in the present invention are those wherein the range of degree of acetylization is 1-34 weight %, preferably 1-16 weight %, more preferably 1-7 weight %, the butyl groups are in the range of 16-60 weight %, preferably 25-60 weight %, and more preferably 40-60 weight %, and the viscosity, as determined by the testing method in ASTM-D-1343-54T, of 0.005-5 second, preferably 0.005-3 second more preferably 0.005-1 second. Specifically advantageous are those products of Eastman Kodak of the U.S.A., eg, its trade names, such as EAB-171-2, EAB-381-2, EAB-531-1, EAB-551-0.2 and EAB-551-0.01 [The first two figures show the content of the butyl groups (weight %), the third place of the same, the content of the hydroxyl groups and the last figure, the viscosity (in seconds)], and among them EAB-551-0.2 and EAB-551-0.01 containing more butyl groups and having a low viscosity are preferable in view of the solubility, compatibility, and viscosity characteristics, etc.

As examples of vinyl-type monomers to be copolymerized with CAB may be preferably mentioned radically polymerizable compounds having 1-2 $\alpha,\beta$-ethylenically unsaturated bonds, preferably only one bond, and for example, one or more can appropriately be selected from the following and used as a monomeric component.

(A) Vinyl aromatic compounds such as styrene, vinyltoluene and $\alpha$-methyl styrene or other vinyl monomers such as vinyl acetate, acrylonitrile and methacrylonitrile;

(B) Alkyl or cycloalkyl esters of acrylic acid or methacrylic acid, having 1-24 carbon atoms such as methyl acrylate, methyl methacrylate, ethyl acrylate, ethyl methacrylate, n-butyl acrylate, n-butyl methacrylate, i-butyl acrylate, i-butyl methacrylate, tert-butyl acrylate, tert-butyl methacrylate, cyclohexyl acrylate, cyclohexyl methacrylate, 2-ethylhexyl acrylate, 2-ethylhexyl methacrylate, lauryl arylate, lauryl methacrylate, stearyl acrylate and stearyl methacrylate;

(C) Hydroxyalkyl esters of acrylic acid or methacrylic acid, having 1-24 carbon atoms such as 2-hydroxyethyl acrylate, 2-hydroxyethyl methacrylate hydroxypropyl acrylate and hydroxypropyl methacrylate;

(D) $\alpha,\beta$-ethylenically unsaturated aliphatic carboxylic acids such as acrylic acid, methacrylic acid, itaconic acid and crotonic acid;

(E) Functional acrylamides or methacrylamides such as acrylamides, methacrylamides, N-methylacrylamide, N-ethylmethacrylamide and N-methylolacrylamide and N-methylolmethacrylamide; and (F) Vinyl monomers containing glycidyl such as glycidyl acrylate, glycidyl methacrylamide and allylglycidyl ether.

As a preferable example of a monomeric component according to the present invention may be listed a monomeric blend obtained by combining, if necessary, with a small amount of acrylic acid or methacrylic acid, a main monomeric constituent using two or more vinyl-type monomers selected from styrene, methyl methacrylate, ethyl acrylate, ethyl methacrylate, n-butyl acrylate, n-butyl methacrylate, 2-hydroxyethyl acrylate and 2-hydroxyethyl methacrylate among the above vinyl monomers, but it should be understood that the present invention is not limited to the above combination.

Particularly, as a monomeric component to be copolymerized with CAB a monomeric mixture is preferably used which contains 5-35 weight %, preferably 10-25 weight % styrene, based on the total weight of said monomeric component, the rest consisting of other one or more vinyl monomers, particularly acrylic-type or methacrylic-type monomers such as methyl methacrylate, ethyl acrylate, ethyl methacrylate, n-butyl acrylate, n-butyl methacrylate, 2-hydroxyethyl acrylate and 2-hydroxyethyl methacrylate.

The ratio of copolymerization of CAB to the monomeric component consisting of the above vinyl-type monomers can widely be varied according to the composition proportion of the monomeric component to be used, but in general, there can be blended 5-75 weight %, preferably 10-50 weight %, more preferably 10-30 weight % of CAB; and 95-25 weight %, preferably 90-50 weight %, and more preferably 90-70 weight % of said monomeric component based on the total weight of CAB and the monomeric component.

Copolymerization of CAB with the above monomeric component can be conducted by solution polymerization in the presence of a radical polymerization initiator.

As the solvent to be used in this solution polymerization are listed alkylbenzene derivatives such as benzene, toluene and xylene, alcoholic solvents such as n-butanol and iso-butanol, acetate ester-type solvents such as butyl acetate, ethyl acetate, Cellosolve acetate and butyl Cellosolve, ketone-type solvents such as acetone and methyl-ethyl-ketone, and they can be used singly or as a mixture. And as polymerization temperature is employed temperatures in the range of about 50°-about 200° C., and preferably about 80°-about 150° C.

As a radical polymerization initiator, inter alia organic peroxides are preferably used, e.g., peroxide polymerization initiators of peroxide type such as benzoyl peroxide, lauroyl peroxide, and dicumyl peroxide and polymerization initiators of hydroperoxide type such as tert-butyl hydroperoxide and cumene hydroperoxide, and other polymerization initiators of ketone peroxide and perester types are also usable. These polymerization initiators are added to the polymerization reaction system singly or using two or more. Further, in addition to the above peroxides, hydroperoxides, etc., polymerization initiators of the azo type, such as azobisisobutyronitrile may be jointly used. Particularly benzoyl peroxide is preferable.

In the copolymerization reaction using the above organic peroxides as a polymerization initiator, it is in general supposed that free radicals of the organic compounds caused by the heat decomposition of those polymerization initiators cause what is called chain transfer on a hydrocarbon compound, and with the free radicals generated on that hydrocarbon compound is initiated polymerization of vinyl-type monomers and the vinyl-type monomers grow on the hydrocarbon compound in the branched form to form a graft copolymer. In the copolymerization as well using CAB and vinyl-type monomers, it is believed that by such reaction mechanism, there is formed a graft copolymer of CAB and vinyl-type monomers.

When a vinyl-type monomer is thus grafted to the hydrocarbon compound, it is in general understood that the greater the number of grafts, that is, branches and the greater the length of branches, the more the solubility of the formed graft copolymer in organic solvents is increased. In the graft copolymer in the present invention using CAB, it is presumed that on the same ground the solubility of CAB and its compatibility with acrylic resins will be improved.

Further, in the present invention it is desirable that substantially all of the blended CAB be copolymerized with vinyl-type monomers, but a small amount of CAB can be, without hinderance, included as unreacted in said copolymer.

The thus formed CAB-modified vinyl-type copolymer has in general the following properties, depending on the kinds of vinyl-type monomers to be used for copolymerization.

First, there do not occur troubles that the copolymer becomes turbid during the storage owing to the poor compatibility of CAB with acrylic resins, or seeding occur in the paint.

Secondly, by the improved compatibility of CAB with acrylic resins, the smoothness of the paint film becomes better, and a clear topcoating is generally unnecessary because the paint film is rich in gloss and smoothness, depending on the kind of vinyl-type monomers for use in copolymerization. Thus even by 1C-1B process can be provided paints of excellent metallic finishes.

Thirdly, it becomes possible to use styrene monomers, which has so far been almost unusable on the grounds that the compatibility with CAB is deteriorated. Such styrene monomers may be used in an amount of about 5–35 weight %, based on the monomeric composition constituting the acrylic resins. By the incorporation of this styrene monomer as a constituent component, the adhesion of the metallic paint film to the substrate, or the adhesive force between the metallic paint film and the clear topcoating is improved, as well as the dispersion of the pigment in the metallic paint and also resistance to water, chemicals and weather in the whole metallic painting system is improved.

The thus prepared CAB-modified vinyl-type copolymer is used as a vehicle in the metallic paint of the present invention. The preparation of a metallic paint using said CAB-modified vinyl-type copolymer can be done by conventional techniques. For example, in an organic solvent solution of the above CAB-modified vinyl-type copolymer, there are dispersed metallic powders such as aluminum, copper, bronze, titanium dioxide-coated mica, micaceous iron oxide, nickel sulfide, cobalt sulfide, manganese sulfide, titanium nitride powders and if necessary, coloring pigments and/or other customary paint additives, for instance, a leveling agent such as Modaflow of Monsanto Chemical of U.S.A. and Acronal of 4F of BASF of West Germany. Still further, if necessary, the viscosity is adjusted with a diluting solvent to obtain a metallic paint suitable for the process of the present invention.

As an organic solvent or diluting solvent used herein are listed alkylbenzene derivatives such as benzene, toluene and xylene; alcoholic solvents, such as n-butanol and iso-butanol; acetate ester solvents, such as butyl acetate, ethyl acetate, Cellosolve acetate and butyl Cellosolve; and ketone solvents, such as acetone and methyl ethyl ketone; and they can be used singly or as a mixture. The final concentration of the above CAB-modified copolymer in the above solvent is not critical but can be widely altered depending upon the coating conditions. In general, its concentration can be 10–80 weight %, preferably 20–40 weight %, based on the weight of the paint.

And the amount of metallic powders blended is not critical either but can be extensively varied with the kinds of metallic powders. However, it can be 5–30 weight %, preferably 5–20 weight % based on the weight of the paint. As the particle diameter of metallic powders to be blended, there is in general preferable one fully in the range having an average particle diameter of 3–20 microns and a particle size distribution of 3–40 microns.

Still further, in the metallic paint of the present invention can be blended a hardening agent which reacts with the functional groups in the above CAB-modified vinyl-type copolymer to form a crosslinking structure, and in general, it is desirable to do so. As a blendable hardening agent the ideal one is one which reacts with the hydroxyl group in the CAB-modified vinyl-type copolymer to harden the paint film. Typical, of these, are the amino-aldehyde resins, obtained by the reaction of amino compounds, such as melamine, urea, benzoguanamine, acetoguanamine and spiroguanamine with aldehyde compounds; and blocked isocyanate compounds of a multifunctional and non-yellowing type in which the aromatic or aliphatic polyisocyanate compounds are blocked with a volatile, low-molecular active hydrogen compound.

Among the above resins, the more preferable are the melamine-formaldehyde resins, such as butylated melamine resins and methylated melamine resins. The ratio of the CAB-modified vinyl-type copolymer to the above hardening agent in this case is generally arranged in such a manner that the weight ratio of the copolymer to the hardening agent falls in the range of 60/40 to 90/10, preferably 65/35 to 80/20.

The metallic paint of the present invention can be applied to a substrate surface by conventional application methods, such as by air spray painting, electrostatic air spray painting and electrostatic atomized spray painting, and as the thickness of a paint film at that time, a range of about 20–50 microns, preferably 25–35 microns, is suitable as a dry paint film in the case of a metallic finish by the 1C-1B process. On the other hand, in the case of a metallic finish by the 2C-1B process, usually a dry paint film has a range of about 5-about 30 microns, preferably about 15-about 25 microns.

According to one embodiment of the process of this invention, the metallic dry paint film thus formed, can be directly baked by a method, which will be described later on, and thereby can be formed a metallic paint film glossy, smooth, which is crack-and peel-resistant, and excellent in physical properties such as resistance to chemicals, water and weather by employing a 1C-1B process.

However, according to the process of the present invention, in another preferable embodiment, the metallic paint film, coated and dried as above, can be coated with a thermosetting resin-type clear topcoating without being baked and in the unhardened state (2C-1B process).

As a thermosetting resin-type clear topcoating for use in the formation of a paint film by the 2C-1B process, a thermosetting acrylic-type resin is generally preferable and the ones belonging to a type containing a combination of a conventional functional acrylic-type copolymer and a crosslinking agent, which have a good adhesive force, to a metallic base paint film and a good weatherability can be optionally selected from various types of conventional clear topcoatings without any particular limitations. There is preferably used a clear paint consisting of an acrylic resin containing units derived from hydroxyl functional acrylic-type monomers in the polymeric chain with the abovementioned amino resin-type across-linking agents, such as butylated melamine-formaldehyde resins or methylated melamine-formaldehyde resins.

The clear topcoating usable in the process of the present invention is prepared by dissolving the above acrylic resin and crosslinking agent in an organic solvent, for example, alkylbenzene derivatives such as benzene, toluene and xylene, alcoholic solvents, such as n-butanol and isobutanol, acetate ester-type solvent such as butyl acetate, ethyl acetate, Cellosolve acetate and butyl Cellosolve, ketone solvents, such as acetone and methyl ethyl ketone and petroleum mixed solvents, such as "Swasol No. 1000" of Maruzen Oil Co. Ltd. in a concentration in which viscosity suitable for coating is obtained. Of course, at that time, in said clear paint can be blended paint components usually added in preparing a clear topcoating, eg, a painted surface adjustor, such as silicone oil.

As a clear topcoating applied in the 2C-1B process in the present invention, is particularly recommended a thermosetting acrylic resin to maintain weatherability of the metallic paint film for a long time, but this is not limitative, and it is of course, possible to use other thermosetting resin-type clear topcoatings, eg, conventional paints consisting mainly of amino-alkyd resins.

Coatings of such a clear topcoating can be conducted by conventional application methods, such as air spray painting, electrostatic air spray painting, electrostatic atomized spray painting and electrostatic airless spray painting, and the thickness of the paint film at that time is sufficient being in the range of about 10-about 50 microns, preferably about 25-about 40 microns, as a dry paint film.

After the clear topcoating is applied, baking is conducted. Baking can be conducted by conventional methods, with an electric hot-air dryer, an indirect hot-air oven, a direct hot-air oven, an infrared ray oven, etc. by maintaining the paint film at temperatures of about 80° to about 180° C. for about 15-about 45 minutes.

In this way, the process for forming a metallic paint film by the 1C-1B or the 2C-1B processes involved in the present invention has the advantage that the metallic paint and clear topcoating can be easily attained at the time of painting by conventional means without the need of any particular equipment, apparatus and special way of use.

Further, according to the above process of the present invention, the following excellent technological effects can be produced.

First, if the metallic paint of the present invention using a CAB-vinyl-type graft copolymer containing 5–75 weight % of CAB is applied to a substrate surface, the viscosity of the coated paint rapidly rises as the diluting solvent contained in said paint is volatilized. The degree of this viscosity rise becomes very great as compared with paint vehicles containing no CAB. This becomes the first factor in preventing the movement of metallic powders, such as aluminum powders and imparts a good metallic feeling to the coated product.

And since in the CAB-vinyl-type graft copolymer, the substantial solubility of CAB and its compatibility with acrylic resins has been improved, a paint film obtained with the use of the metallic paint of the present invention possesses excellent smoothness on the coating surface. In addition, according to the present invention, styrene can be conveniently employed in the vinyl-type monomer composition in the graft copolymerization system, said styrene which has not substantially been used in the copolymerization system. The various reasons why it has not been used is because of poor compatibility and the occurrences of turbidity in the coat where it is used and the formation of blisters or seedings, caused by the coalescence of CAB, or which has been used only by 5–10 weight % or below in monomer constitution even if used.

Since styrene is a monomeric component which produces a polymer excellent in resistance to chemicals and water and further has the function of reinforcing adhesion to a substrate as well as producing excellent adhesive force between the polymer and thermosetting resin type clear topcoating when applied. Also, when a CAB-vinyl-type graft copolymer, containing as much as 5–35 weight % of styrene, based on the total weight of the monomeric component, is in use as a vehicle, there is a great advantage that in addition to the improvement of the finish appearance of the painting system of this invention, the durability performance of the whole metallic paint film is improved, because resistance to chemicals and water, because the adhesion to a substrate and the adhesive force between the styrene based polymer and a clear topcoated paint film, when used, are particularly improved.

In the present invention, the predetermined object is attained by causing the abovementioned CAB-vinyl-type graft copolymer to be contained in a metallic paint containing metallic powders, but the usefulness of said graft copolymer is not limited only to the case of a metallic paint film but in the case of a non-metallic paint film, that is, a solid color paint film using an ordinary coloring pigment as well. The copolymer can also be applied for use in a finish wherein a 1C-1B or 2C-1B coating process is employed to produce good adhesion to the substrate as well as a thermosetting acrylic resin-type topcoating, and also good resistance to water and weather in the coating system is maintained.

The present invention will be described in detail below with reference to Examples and Comparative examples. The parts and % in Examples are all by weight.

PREPARATION OF CAB-VINYL-TYPE GRAFT COPOLYMER SOLUTION: MANUFACTURING EXAMPLE 1

The following components were charged in a reaction vessel provided with a thermometer, an agitator, a reflux condenser and a dropping funnel:

| Xylol | 48 parts |
|---|---|
| n-Butanol | 12 |
| EAB-551-0.2 | 20 |
| Total: | 80 parts |

The above mixture was heated in an atmosphere of purified nitrogen gas to 110° C. in about one hour. On checking the temperature at 110° C. and for the complete dissolution of CAB, a mixed solution of vinyl-type monomers and a polymerization initiator in the following recipe was dropwise added to the CAB solution in 3 hours.

| Styrene | 20 parts |
|---|---|
| Methylmethacrylate | 14 |
| n-Butyl methacrylate | 52 |
| 2-Hydroxyethyl methacrylate | 13 |
| Acrylic acid | 1 |
| Xylene | 10 |
| Benzoyl peroxide | 2 |
| Total: | 112 parts |

30 Minutes after the dropping, 0.5 part of azobisisobutyronitrile was added, and further in subjected to a nitrogen atmosphere of purified nitrogen at 110° C. for 2 hours, 50 parts of xylol and 26.7 parts of butyl acetate were added to obtain a CAB-vinyl-type graft copolymer solution A with 45% of a solid content. The copolymer solution was colorless and transparent and the Gardner bubble viscosity (25° C.) was V.

MANUFACTURING EXAMPLES 2–20

CAB-vinyl-type copolymer solutions B-G and K-Q were manufactured by the manufacturing process for producing a CAB-vinyl-type graft copolymer solution A in the Manufacturing procedure of Example 1. However, for comparison, resin solutions H-J manufactured in Manufacturing Examples 8-10 and resin solutions R-T in Manufacturing Examples 18-20 are acrylic resin solutions containing no CAB.

The maufacturing process followed the polymerization process for the vinyl-type monomer in Manufacturing Example 1.

The composition of vinyl-type monomers, the amount of CAB (EAB-551-0.2 of Eastman Kodak), concentration of solid content in the solution (weight %) and Gardner bubble viscosity (25° C.), of the CAB-vinyl-type copolymer and the vinyl-type copolymer containing no CAB, are given in Table 1; Manufacturing Example I being included.

In Table 1, for solutions A-J in Manufacturing Examples 1-10, testing by the 1C-1B process was conducted and for solutions K-T in Manufacturing Examples 11-20, testing by the 2C-1B process was conducted.

TABLE 1

| | | For testing by 1C-1B coating process | | | | | | | | | |
|---|---|---|---|---|---|---|---|---|---|---|---|
| Manufacturing example | | 1 | 2 | 3 | 4 | 5 | 6 | 7 | 8 | 9 | 10 |
| Name of solutions | | A | B | C | D | E | F | G | H | I | J |
| Vinyl monomer composition (parts) | Styrene | 20 | 0 | 30 | 20 | 20 | 20 | 20 | 0 | 20 | 30 |
| | Methyl methacrylate | 14 | 34 | 4 | 14 | 14 | 14 | 14 | 34 | 14 | 4 |
| | n-Butyl methacrylate | 52 | 52 | 52 | 52 | 52 | 52 | 52 | 52 | 52 | 52 |
| | Ethyl methacrylate | | | | | | | | | | |
| | 2-Hydroxyethyl methacrylate | 13 | 13 | 13 | 13 | 13 | 13 | 13 | 13 | 13 | 13 |
| | Acrylic acid | 1 | 1 | 1 | 1 | 1 | 1 | 1 | 1 | 1 | 1 |
| EAB-551-0.2 | | 20 | 20 | 20 | 10 | 40 | 100 | 200 | — | — | — |
| Solvent composition (parts) | Xylol | 108 | 108 | 108 | 99 | 126 | 180 | 270 | 90 | 90 | 90 |
| | Toluol | | | | | | | | | | |
| | n-Butanol | 12 | 12 | 12 | 11 | 14 | 20 | 30 | 10 | 10 | 10 |
| | Butyl acetate | 26.7 | 26.7 | 26.7 | 24.4 | 31.1 | 100 | 150 | | | |
| Concentration of solid content in solutions (weight %) | | 45 | 45 | 45 | 45 | 45 | 40 | 40 | 50 | 50 | 50 |
| Viscosity of solutions (Gardner bubble viscosity at 25° C.) | | V | W | U | S-T | Z2 | Y | Z3 | V-W | V | U |
| Clearness of coat | Solution dried as it is (after heating at 130° C. for 3 hours) | ⊚ | ⊚ | ⊚ | ⊚ | ⊚ | ⊚ | ⊚ | | | |
| | Dried by mixing 20% of EAB-551-0.2 based on the solid content (100%) of solution (heated at 130° C. for 3 hours) | — | — | — | — | — | — | — | ⊚ | △ | X |

| | | For testing by 2C-1B coating process | | | | | | | | | |
|---|---|---|---|---|---|---|---|---|---|---|---|
| Manufacturing example | | 11 | 12 | 13 | 14 | 15 | 16 | 17 | 18 | 19 | 20 |
| Name of solutions | | K | L | M | N | O | P | Q | R | S | T |
| Vinyl monomer composition (parts) | Styrene | 20 | 0 | 30 | 20 | 20 | 20 | 20 | 0 | 20 | 30 |
| | Methyl methacrylate | 20 | 40 | 10 | 20 | 20 | 20 | 20 | 40 | 20 | 10 |
| | n-Butyl methacrylate | | | | | | | | | | |
| | Ethyl methacrylate | 47 | 47 | 47 | 47 | 47 | 47 | 47 | 47 | 47 | 47 |
| | 2-Hydroxyethyl methacrylate | 12 | 12 | 12 | 12 | 12 | 12 | 12 | 12 | 12 | 12 |
| | Acrylic acid | 1 | 1 | 1 | 1 | 1 | 1 | 1 | 1 | 1 | 1 |
| EAB-551-0.2 | | 20 | 20 | 20 | 10 | 40 | 100 | 200 | — | — | — |
| Solvent composition | Xylol | 70 | 70 | 70 | 60 | 90 | 100 | 150 | 50 | 50 | 50 |
| | Toluol | 25 | 25 | 25 | 25 | 25 | 50 | 100 | 25 | 25 | 25 |

TABLE 1-continued

| (parts) | n-Butanol | 25 | 25 | 25 | 25 | 25 | 50 | 50 | 25 | 25 | 25 |
|---|---|---|---|---|---|---|---|---|---|---|---|
| | Butyl acetate | 26.7 | 26.7 | 26.7 | 24.4 | 31.1 | 100 | 150 | | | |
| Concentration of solid content in solutions (weight %) | | 45 | 45 | 45 | 45 | 45 | 40 | 40 | 50 | 50 | 50 |
| Viscosity of solutions (Gardner bubble viscosity at 25° C.) | | X | Y | W-X | V | $Z_4$ | Z | $\overset{\circ}{Z_6}$ | V | V-W | W |
| Clearness of coat | Solution dried as it is (after heating at | ◎ | ◎ | ⓐ | ◎ | ◎ | ◎ | ◎ | | | |
| | Dried by mixing 20% of EAB-551-0.2 based on the solid content (100%) of solution (heated at 130° C. for 3 hours) | | | | | | | | ◎ | Δ | X |

Note:
Clearness of coat: Estimation is made for coats obtained by applying solutions on a transparent glass sheet, allowing tham to stand, and heating them at 130° C. for 3 hours.
◎: Clearness
ⓐ: Extent to which it is slightly stained
Δ: Slightly stained
X: Turbid (separation of components)

PREPARATION OF METALLIC PAINT (1) Metallic paint A

Metallic paint A was prepared with the use of CAB-vinyl-type graft copolymer solution A by the following blending:

| | |
|---|---|
| CAB-vinyl-type graft copolymer solution A | 222.2 parts |
| Butylated melamine resin solution (Note 1) | 55.6 |
| Aluminum paste (Note 2) | 10 |
| Carbon black (Note 3) | 0.2 |
| Cyanine Blue (Note 4) | 0.5 |
| Total: | 288.5 parts |

(Note 1): Tradename; Super Beckamin J-820 of Dainippon Ink and Chemicals, Inc., Japan Solid content: 60%
(Note 2): Trade name: Alumipaste 1109 MA of Toyo Aluminum K.K., Japan
(Note 3): Trade name: Neospectra Beads AG of Columbia Carbon Inc., U.S.A.
(Note 4): Trade name: Cyanine Blue No. 5030 SA of Dainippon Ink and Chemicals, Inc., Japan Then, the viscosity of this metallic paint A was adjusted to 18 seconds (Ford cup No. 4/20° C.) by a mixed solvent consisting of 40 parts of toluene, 30 parts of Swasol No. 1000, 20 parts of ethyl acetate and 10 parts of n-butanol.

(2) Metallic paints B–Z

Metallic paints B–J and N–W were prepared following the blending of metallic paint A with the use of CAB-vinyl-type graft copolymer solutions B–G and K–Q and acrylic resin solutions H–J and R–T containing no CAB (for comparison).

Further, to compare the CAB-vinyl-type graft copolymer system with the system involving the simple blending of CAB with acrylic resins, CAB was blended with acrylic resin solutions H–J and R–T so that the content of EAB-551-0.2 might be 20%, and metallic paint K–M and X–Z were prepared. In this case, EAB-551-0.2 was used in the form of a 30% solution arranged by a mixed solvent consisting of 40 parts of toluol, 40 parts of ethyl acetate, 10 parts of n-butanol and 10 parts of xylol.

Further, metallic paints A–M were prepared for making tests by the 1C-1B process, and the viscosity of the paints was adjusted to 18 seconds (Ford cup No. 4/20° C.) with the mixed solvent which was used for the manufacture of metallic paint A.

Still further, metallic paints N–Z were prepared for making tests by the 2C-1B process and the viscosity of the paints was adjusted to 14 seconds (Ford cup No. 4/20° C.) with the mixed solvent which was used for the manufacture of metallic paint A.

The blending of these metallic paints A–Z and the concentration (weight %) of solid content at the time of painting are given in Tables 2 and 3.

TABLE 2

| Name of metallic paint | | A | B | C | D | E | F | G | H | I | J | K | L | M |
|---|---|---|---|---|---|---|---|---|---|---|---|---|---|---|
| CAB-vinyl-type graft copolymer solution | A | 222.2 | | | | | | | | | | | | |
| | B | | 222.2 | | | | | | | | | | | |
| | C | | | 222.2 | | | | | | | | | | |
| | D | | | | 222.2 | | | | | | | | | |
| | E | | | | | 222.2 | | | | | | | | |
| | F | | | | | | 250 | | | | | | | |
| | G | | | | | | | 250 | | | | | | |
| 50% acrylic resin solution | H | | | | | | | | 200 | | | | | |
| | I | | | | | | | | | 200 | | | | |
| | J | | | | | | | | | | 200 | | | |
| | H | | | | | | | | | | | 160 | | |
| | I | | | | | | | | | | | | 160 | |
| | J | | | | | | | | | | | | | 160 |
| 30% CAB solution | | | | | | | | | | | | 66.7 | 66.7 | 66.7 |
| 60% Super Beckamin J-820 | | 55.6 | 55.6 | 55.6 | 55.6 | 55.6 | 55.6 | 55.6 | 55.6 | 55.6 | 55.6 | 55.6 | 55.6 | 55.6 |
| Pigments | Alumipaste 1109 MA | 10 | 10 | 10 | 10 | 10 | 10 | 10 | 10 | 10 | 10 | 10 | 10 | 10 |
| | Neospectra beads AG | 0.2 | 0.2 | 0.2 | 0.2 | 0.2 | 0.2 | 0.2 | 0.2 | 0.2 | 0.2 | 0.2 | 0.2 | 0.2 |
| | Cyanine blue #5030SA | 0.5 | 0.5 | 0.5 | 0.5 | 0.5 | 0.5 | 0.5 | 0.5 | 0.5 | 0.5 | 0.5 | 0.5 | 0.5 |

TABLE 2-continued

| Name of metallic paint | A | B | C | D | E | F | G | H | I | J | K | L | M |
|---|---|---|---|---|---|---|---|---|---|---|---|---|---|
| Concentration of solid content at the time of painting (%) | 28.0 | 26.7 | 29.2 | 30.6 | 24.5 | 23.0 | 21.2 | 30.6 | 31.0 | 31.5 | 26.5 | 27.1 | 29.1 |

TABLE 3

| Name of metallic paint | | N | O | P | Q | R | S | T | U | V | W | X | Y | Z |
|---|---|---|---|---|---|---|---|---|---|---|---|---|---|---|
| CAB-vinyl- | K | 222.2 | | | | | | | | | | | | |
| type graft | L | | 222.2 | | | | | | | | | | | |
| copolymer | M | | | 222.2 | | | | | | | | | | |
| solution | N | | | | 222.2 | | | | | | | | | |
| | O | | | | | 222.2 | | | | | | | | |
| | P | | | | | | 250 | | | | | | | |
| | Q | | | | | | | 250 | | | | | | |
| 50% acrylic | R | | | | | | | | 200 | | | | | |
| resin | S | | | | | | | | | 200 | | | | |
| solution | T | | | | | | | | | | 200 | | | |
| | R | | | | | | | | | | | 160 | | |
| | S | | | | | | | | | | | | 160 | |
| | T | | | | | | | | | | | | | 160 |
| 30% CAB solution | | | | | | | | | | | | 66.7 | 66.7 | 66.7 |
| 60% Super Beckamin J-820 | | 55.6 | 55.6 | 55.6 | 55.6 | 55.6 | 55.6 | 55.6 | 55.6 | 55.6 | 55.6 | 55.6 | 55.6 | 55.6 |
| Pig- Alumipaste ments 1109 MA | | 10 | 10 | 10 | 10 | 10 | 10 | 10 | 10 | 10 | 10 | 10 | 10 | 10 |
| Neospectra beads AG | | 0.2 | 0.2 | 0.2 | 0.2 | 0.2 | 0.2 | 0.2 | 0.2 | 0.2 | 0.2 | 0.2 | 0.2 | 0.2 |
| Cyanine blue #5030SA | | 0.5 | 0.5 | 0.5 | 0.5 | 0.5 | 0.5 | 0.5 | 0.5 | 0.5 | 0.5 | 0.5 | 0.5 | 0.5 |
| Concentration of solid content at the time of painting (%) | | 26.0 | 25.7 | 26.5 | 26.4 | 24.5 | 22.5 | 20.8 | 28.0 | 28.5 | 27.0 | 25.0 | 24.8 | 25.5 |

PREPARATION OF RESIN SOLUTION FOR USE IN A THERMOSETTING ACRYLIC RESIN-TYPE CLEAR TOPCOATING 45 parts of an aromatic petroleum solvent (Trade name: Swasol No. 1000 or Maruzen Oil Co. Ltd.) was charged in a reaction vessel provided with a thermometer, an agitator, a reflux condenser and a dropping funnel and heated in an atmosphere of purified nitrogen and the supply of the nitrogen gas was suspended when the temperature reached 120° C. Then, the following mixed solution of vinyl-type and acrylic-type monomers and polymerization initiators was added dropwise in 3 hours.

| Styrene | 30 parts |
|---|---|
| n-Butyl methacrylate | 22 |
| Lauryl methacrylate | 30 |
| 2-Hydroxylmethacrylate | 15 |
| Methacrylic acid | 3 |
| n-Butanol | 15 |
| Azobisisobutyronitrile | 2 |
| Total: | 117 parts |

MANUFACTURE OF THERMOSETTING ACRYLIC RESIN-TYPE CLEAR TOPCOATING

A thermosetting acrylic resin-type clear topcoating was prepared by the following blending, using the aforementioned acrylic resin solution for use in a clear topcoating.

| 50% acrylic resin solution for use in clear topcoating | 140 parts |
|---|---|
| 60% Super Beckamin J-820 | 50 |
| Total: | 190 parts |

Then, the viscosity of this clear paint was adjusted to 30 seconds (Ford cup No. 4/20° C.) with Swasol No. 1000. The solid content of this paint at the time of coating was 41%.

EXAMPLE 1

A polybutadiene-type electro-depositable primer (Trade name: ELECRON No. 6000 of Kansai Paint Co., Ltd., Japan) was electrocoated on a dull steel plate, 0.8 mm thick chemically treated with zinc phosphate so that the dry paint film might be about 20μ thick and baked at 170° C. for 20 minutes. Then, the primer was polished with No. 400 sand paper and degreased by wiping it with petroleum benzine. Then, an aminoalkyd resin-type surfacer for automobile bodies (Trade name: Amilac Surfacer of Kansai Paint Co., Ltd.) was coated by air spraying and baked at 140° C. for 30 minutes. Then, it was water sanded with No. 400 sand paper, hydro-extracted and dried. This was wiped with petroleum benzine, degreased and made into a metallic plate for testing.

On this material was applied metallic paint A by the following coating conditions.

[Coating conditions]
Temperature and humidity of coating base: 23° C. 75 RH

| Coater: | Electrocoater Auto REA (Japan Ransburg K.K.) |
|---|---|
| Atomized air pressure: (Pressure at the gun at the time of spray) | 5 kg/cm$^2$ |
| Amount of discharge: | 400 cc/min. |
| Thickness of paint film: | 30-40μ (thickness of dried paint film) |

After the coating of a metallic paint, the coat was allowed to stand at room temperature for ten minutes and then heated and hardened at 140° C. for 30 minutes with an electric hot air dryer. The obtained coated plate was excellent in metallic feeling. This is called test coated plate No. 1.

EXAMPLES 2-7 AND COMPARATIVE EXAMPLES 1-6

Test coated plates 2-13 were prepared under the same conditions that test coated plate No. 1 was prepared. Test coated plates Nos. 2-7 correspond to Example 2-7 and test coated plates Nos. 8-13 to Comparative Examples 1-6. The kinds of metallic paints used for preparing individual test coated plates, the important points of composition of the CAB-vinyl-type graft copolymer and acrylic resin, which are used for the metallic paints, and the test coated plates are given in Table 4 below.

EXAMPLES 8-14 AND COMPARATIVE EXAMPLES 7-12

Metallic paints were coated in the same way as in Example 1 to obtain a dry film, 20±2μ thick. The above thermosetting acrylic resin-type clear topcoating was applied to obtain a dry film, 30±2μ thick in the same coating conditions as in said metallic paint. The topcoating was allowed to stand at room temperature for 10 minutes and hardened by heating at 140° C. for 30 minutes with an electric hot air dryer to prepare test coated plates Nos. 14-20. These plates correspond to Examples 8-14 and test coated plates Nos. 21-26 to Comparative Examples 7-12. The kinds of metallic paints used for the preparation of the individual test coated plates, the important points of compositions of the CAB-vinyl-type graft copolymer and the acrylic resin used for the metallic paints and the performance test results of the test coated plates are given in Table 5.

TABLE 4

(Test results by 1C-1B coating process)

| | | Characteristics, etc. OF CAB-vinyl-type graft copolymer | | | Evaluation of finish appearance | | | Resistance to chemicals |
|---|---|---|---|---|---|---|---|---|
| No. of test coated plate | Name of metallic paints | No. | Amount of CAB (parts) | Amount of styrene in vinyl monomer system (parts) | Metallic feeling of paint film (Note 1) | Smoothness of coated surface (Note 2) | 60° specular reflectance (%) | 10% H$_2$SO$_4$, 50° C. × 90 minutes, spot (Note 3) |
| Example No. 1 | | | | | | | | |
| 1 | A | A | 20 | 20 | ◎ | ◎ | 93 | Normal |
| 2 | 2 | B | B | 20 | 0 | ◎ | ◎ | 94 | Slightly tarnished |
| 3 | 3 | C | C | 20 | 30 | ◎ | ◎ | 92 | Normal |
| 4 | 4 | D | D | 10 | 20 | ◎ | ◎ | 93 | Normal |
| 5 | 5 | E | E | 40 | 20 | ◎ | ◎ | 95 | Normal |
| 6 | 6 | F | F | 100 | 20 | ◎ | ◎ | 94 | Normal |
| 7 | 7 | G | G | 200 | 20 | ◎ | ◎ | 94 | Normal |
| Comparative Example No. 1 | | | | | | | | |
| | 8 | H | H | — | 0 | ⊚ | ○ | 88 | Tarnished and blisters |
| 2 | 9 | I | I | — | 20 | △ | ○ | 86 | Normal |
| 3 | 10 | J | J | — | 30 | X | ○ | 86 | Normal |
| 4 | 11 | J | H | 20 (Cold blending) | 0 | ◎ | ◎ | 91 | Tarnished and blisters |
| 5 | 12 | L | I | 20 (Cold blending) | 20 | △ | △ | 72 | Normal |
| 6 | 13 | M | J | 20 (Cold blending) | 30 | X | X | Occurrence of seedings 61 | No testing conducted |

| | Moisture test (Note 4) | | Weather test (Note 5) (S.W.O.M. × 1000H) | | | | Adhesive test between coated films (Crosscut test) | |
|---|---|---|---|---|---|---|---|---|
| | State of coated surface | Adhesion test between coated films | Gloss retention (%) | 10% H$_2$SO$_4$, 50° × 90 minutes spot | State of ciated surface | Adhesion test between coated films | No dipping in warm water | After dipping in warm water for 240 hours |
| Example No. 1 | Normal | Normal | 92 | Normal | Normal | Normal | Normal | Normal |
| 2 | Normal | Normal | 93 | Tarnished | Tarnished | Normal | 1 | 1 |
| 3 | Normal | Normal | 91 | Normal | Normal | Normal | 1 | 1 |

TABLE 4-continued (Test results by 1C-1B coating process)

|   | | | | | | | | |
|---|---|---|---|---|---|---|---|---|
| 4 | Normal | Normal | 92 | Normal | Normal | Normal | 1 | 1 |
| 5 | Normal | Normal | 91 | Normal | Normal | Normal | 1 | 1 |
| 6 | Normal | Normal | 91 | Normal | Normal | Normal | 1 | 1 |
| 7 | Normal | Normal | 91 | Normal | Normal | Normal | 1 | 1 |
| Comparative Example No. 1 | Occurrence of blister | Partial peeling | 76 | Tarnished and blisters | Occurrence of blister | Partial peeling | Partial peeling | Partial peeling |
| 2 | Normal | Normal | 72 | Tarnished and blisters | Occurrence of blister | Partial peeling | Normal | Normal |
| 3 | Normal | Normal | 70 | Tarnished and blisters | Occurrence of blister | Normal | Normal | Normal |
| 4 | Occurrence of blister | Partial peeling | 83 | Tarnished and blister | Occurrence of blister | Partial peeling | Partial peeling | Partial peeling |
| 5 | Normal | Normal | 70 | Tarnished and blisters | Occurrence of blister | Normal | Normal | Normal |
| 6 | | | | No testing conducted | | | | |

TABLE 5

(Test results by 2C-1B coating process)

| | No. of test coated plate | Name of metallic paints | No. | Amount of CAB (parts) | Amount of styrene in vinyl monomer system (parts) | Metallic feeling of paint film | Smoothness of coated surface | 60° specular reflectance (%) |
|---|---|---|---|---|---|---|---|---|
| Example No. 8 | 14 | N | K | 20 | 20 | ◉ | ◉ | 98 |
| 9 | 15 | O | L | 20 | 0 | ◉ | ◉ | 96 |
| 10 | 16 | P | M | 20 | 30 | ○ | ○ | 92 |
| 11 | 17 | Q | N | 10 | 20 | ◉ | ○ | 96 |
| 12 | 18 | R | O | 40 | 20 | ◉ | ○ | 97 |
| 13 | 19 | S | P | 100 | 20 | ◉ | ○ | 98 |
| 14 | 20 | T | Q | 200 | 20 | ◉ | ○ | 98 |
| Comparative Example No. 7 | 21 | U | R | — | 0 | △ | ⓐ | 90 |
| 8 | 22 | V | S | — | 20 | △ | ⓐ | 88 |
| 9 | 23 | W | T | — | 30 | △ | ⓐ | 88 |
| 10 | 24 | X | R | 20 (Cold blending) | 0 | ○ | ○ | 93 |
| 11 | 25 | Y | S | 20 (Cold blending) | 20 | △ | △ | 81 |
| 12 | 26 | Z | T | 20 (Cold blending) | 30 | X | X | Occurrence of seedings 64 |

| | Resistance to chemicals 10% H₂SO₄, 50° C. × 90 minutes, spot | Moisture test: Adhesive test between coated films | Moisture test: State of coated surface | Weather test (S.W.O.M. × 2300H) Gloss retention (%) | Adhesive test between coated films (Crosscut test) No dipping in warm water | After dipping in warm water for 240 hours |
|---|---|---|---|---|---|---|
| Example No. 8 | ○ | ○ | ○ | 89 | ○ | ○ |
| No. 9 | Slightly tarnished | ○ | ○ | 88 | ○ | ○ |
| 10 | ○ | ○ | ○ | 89 | ○ | ○ |
| 11 | ○ | ○ | ○ | 86 | ○ | ○ |
| 12 | ○ | ○ | ○ | 89 | ○ | ○ |
| 13 | ○ | ○ | ○ | 90 | ○ | ○ |
| 14 | ○ | ○ | ○ | 90 | ○ | ○ |
| Comparative Example No. 7 | Tarnished and blisters | Partial peeling | Occurrence of blister | 77 | Partial peeling | Partial peeling |
| 8 | Slightly tarnished | | | 81 | Partial peeling | Partial peeling |

TABLE 5-continued (Test results by 2C-1B coating process)

| | | | | | | |
|---|---|---|---|---|---|---|
| 9 | O | O | O | 82 | Partial peeling | Partial peeling |
| 10 | Tarnished and blisters | Partial peeling | Occurrence of blister | 82 | Partial peeling | Partial peeling |
| 11 | O | O | O | 75 | Partial peeling | Partial peeling |
| 12 | | | No testing conducted | | | |

O: Normal
Notes 1 and 2:
Standards of evaluation are as follows:
⊚: Very good
O : Good
Ⓐ Slightly good
Δ: Slightly poor
X: Poor
The more uniform and the evener the coating surface and the glossier the metallic feeling, the better it is.
Note 3:
Tests were made as follows:
Chemicals: 10% (weight) Aqueous solution of $H_2SO_4$
Spot: 5 drops were spotted on each coated plate
Temperature: 50° C.
Time: 90 minutes
Evaluation: Blisters on paint film, tarnish
Note 4:
Each coated plate was dipped in water at 40° C. for 240 hours and 30 minutes after pulling up, the state of coated surface was observed. At the same time peeling test of adhesive tape at the cross-cut portions was conducted.
Note 5:
Each coated plate was placed in a Sunshine-type weather Ometer (S.W.O.M.) and irradiated for 1,000 hours. Then, gloss retention was measured.

Further, with respect to the coated plates in Examples 8–14 and Comparative Examples 7–11, after they were irradiated for 2300 hours with a weather Ometer, gloss retention was measured.

And after the state of the coated surface was observed, the half of the coated plates were dipped in water at 40° C. for 240 hours. 30 Minutes after removing the plates from the water, adhesive tests by adhesive tape peeling at the crosscut portion were conducted. The remaining half were cross cut at intervals of 1 mm and peeling of adhesive tape was conducted.

Examples 1–7 and 8–14 show the metallic finish of the present invention. And Examples 1–7 involve finishing by a 1C-1B coating process and Examples 8–14 by a 2C-1B coating process. Among them, Examples 2 and 9 do not contain styrene at all in the vinyl-type monomer and are slightly inferior to other Examples in resistance to chemicals. In Examples 6, 7, 13 and 14, as a feature of the CAB-vinyl-type graft copolymer, 100 parts and 200 parts of CAB are respectively contained per 100 parts of the vinyl-type monomeric component, the amount of CAB being made great, resulting in the state of coating surface and paint coated film performance being excellent. However, as given in Tables 2 and 3, there is the disadvantage that the concentration of the solid content at the time of painting becomes small.

Comparative Examples 1-6 were prepared by the 1C-1B coating process and Comparative Examples 7-12 were prepared by the 2C-1B coating process. Among them, Comparative Examples 1-3 and 7-9 do not contain CAB and the amounts of styrene are respectively, 0.20 and 30%. In Comparative Examples 1 and 7, with 0% of styrene, the compatibility with EAB-551-0.2 added by 20% is good (See Manufacturing Examples 8-10 and 18-20 in Table 1), but the finish appearance and other performances become poor. In like manner, Comparative examples 2-3 and 8-9 contain styrene in amounts of 20% and 30%, respectively and compatibility with EAB-551-0.2 becomes much deteriorated with the occurrence of stains and separation of components (See Table 1) and like Comparative Examples 1 and 7, finish appearance and other performances are deteriorated.

Further, Comparative Examples 4-6 and 10-12 show blending materials in such a manner that EAB-551-0.2 is contained by 20%, but the ones which do not contain styrene at all improve finish appearance with the addition of CAB as compared with those in Compartive Examples 1 and 7, but in performance test results, defects are still shown. Further, in Comparative Examples 5-6 and 11-12, which contain styrene by 20% and 30%, stains and occurence of seedings (separation of layers) are seen with the addition of CAB, and particularly Comparative Examples 6 and 12 show the coated surface to be in a very bad state and a performance test is not conducted.

The effect of the present invention is obvious by the above Examples and Comparative Examples.

What is claimed is:

1. A process for forming a metallic paint film comprising:
    (a) coating a substrate surface with a metallic paint containing as a vehicle component a modified vinyl-type graft copolymer obtained by graft copolymerizing 5-75 weight % of cellulose acetate butyrate with 95-25 weight % of a monomeric component consisting of one or more vinyl-type monomers, and
    (b) then baking the paint film.

2. A process for forming a metallic paint film comprising:
    (a) coating a substrate surface with a metallic paint containing as a vehicle component a modified vinyl-type graft copolymer obtained by graft copolymerizing 5-75 weight % of cellulose acetate butyrate with 95-25 weight % of a monomeric component consisting of one or more vinyl-type monomers,
    (b) coating a thermosetting resin-type clear topcoating while said coated metallic paint film is in the unhardened state, and
    (c) then baking the paint film.

3. The process of claim 1 or 2 wherein said cellulose acetate butyrate has a degree of acetylation of 1-34 weight% and a butyl content of 16-60 weight%.

4. The process of claim 1 or 2 wherein said cellulose acetate butyrate has a viscosity in the range of 0.005-5 seconds, determined by the test method described in ASTM-D-1343-54T.

5. The process of claim 1 or 2 wherein said monomeric component consists mainly of at least two monomers selected from styrene, methyl methacrylate, ethyl acrylate, ethyl methacrylate, n-butyl acrylate, n-butyl methacrylate, 2-hydroxyethyl acrylate and 2-hydroxyethyl methacrylate.

6. The process of claim 1 or 2 wherein said monomeric component is a monomeric mixture which contains 5-35 weight% of styrene based on the total weight of said monomeric component, the rest consisting of other one or more vinyl-type monomers.

7. The process of claim 6 wherein said other vinyl-type monomers are selected from methyl methacrylate, ethyl acrylate, ethyl methacrylate, n-butyl acrylate, n-butyl methacrylate, 2-hydroxyethyl acrylate and 2-hydroxyethyl methacrylate.

8. The process of claim 1 or 2 said modified vinyl-type graft copolymer is obtained by graft copolymerizing said cellulose acetate butyrate with said monomeric component in the presence of a hydroperoxide-type and/or a peroxide-type polymerization initiator.

9. The process of claim 1 or 2 wherein said metallic paint further contains a hardening agent.

10. The process of claim 9 wherein said hardening agent is an amino-aldehyde resin or blocked isocyanate.

11. The process of claim 1 or 2 wherein said metallic paint contains 10-80 weight% of said modified vinyl-type copolymer based on the weight of said paint.

12. The process of claim 1 or 2 wherein said metallic paint contains 5-30 weight% of metallic powders.

13. The process of claim 2 wherein said clear topcoating is a thermosetting acrylic resin-type clear topcoating.

14. The process of claim 1 or 2 wherein said baking is conducted at a temperature of about 80°-about 180° C.

15. The process of claim 1 or 2 wherein said modified vinyl-type graft copolymer is obtained by graft copolymerizing 10-50 weight% of cellulose acetate butyrate with 90-50 weight% of a monomeric component consisting of one or more of said vinyl-type monomer.

16. An article coated by the process of claim 1 or 2.

* * * * *